United States Patent
Maaref (10) Patent No.: US 10,778,387 B2
(45) Date of Patent: Sep. 15, 2020

(54) SYSTEM AND METHOD FOR GROUP-ASSISTED DOWNLINK TRANSMISSION

(71) Applicant: Amine Maaref, Ottawa (CA)

(72) Inventor: Amine Maaref, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 188 days.

(21) Appl. No.: 15/360,604

(22) Filed: Nov. 23, 2016

(65) Prior Publication Data
US 2018/0145805 A1    May 24, 2018

(51) Int. Cl.
| | |
|---|---|
| *H04L 5/00* | (2006.01) |
| *H04W 72/12* | (2009.01) |
| *H04W 4/70* | (2018.01) |
| *H04W 4/80* | (2018.01) |
| *H04W 4/08* | (2009.01) |
| *H04W 72/04* | (2009.01) |

(Continued)

(52) U.S. Cl.
CPC ......... *H04L 5/0035* (2013.01); *H04L 5/0005* (2013.01); *H04L 5/0053* (2013.01); *H04L 5/0092* (2013.01); *H04W 4/08* (2013.01); *H04W 4/70* (2018.02); *H04W 4/80* (2018.02); *H04W 72/042* (2013.01); *H04W 72/048* (2013.01); *H04W 72/085* (2013.01); *H04W 72/1289* (2013.01); *H04L 1/0002* (2013.01); *H04L 5/0007* (2013.01); *H04W 88/04* (2013.01)

(58) Field of Classification Search
CPC ... H04L 5/0035; H04L 1/0001; H04L 5/0005; H04W 72/1289; H04W 4/70; H04W 4/08; H04W 4/80; H04W 72/085; H04W 72/048; H04W 72/042; H04W 88/04
See application file for complete search history.

(56) References Cited

U.S. PATENT DOCUMENTS 9,130,904 B2 * 9/2015 Savini .................... H04L 63/08
9,172,512 B2   10/2015 Maaref et al.
(Continued)

FOREIGN PATENT DOCUMENTS

| CN | 102077658 B | 8/2013 |
|---|---|---|
| CN | 104662817 A | 5/2015 |

(Continued)

OTHER PUBLICATIONS

Kim, Juyeop, et al., "Group Communication Over LTE : A Radio Access Perspective", IEEE Communications Magazine, Jan. 12, 2016, 19 pages.

(Continued)

*Primary Examiner* — Mounir Moutaouakil (57) ABSTRACT

A network may have data to send to a target UE in a D2D group. It is desired to use the D2D group to help facilitate the downlink transmission of the data to the target UE. In one embodiment, control information in a downlink control channel is masked with a D2D group ID. UEs in the D2D group use the group ID to unmask the control information. The control information is used to locate and decode data in the downlink data channel that is meant for the target UE. Other UEs in the D2D group may forward the decoded data (or a re-encoded version of the decoded data or other information) to the target UE over a D2D channel.

4 Claims, 7 Drawing Sheets

(51) Int. Cl.
*H04W 72/08* (2009.01)
*H04L 1/00* (2006.01)
*H04W 88/04* (2009.01)

(56) References Cited

U.S. PATENT DOCUMENTS

| | | | |
|---|---|---|---|
| 9,363,678 B2* | 6/2016 | Tesanovic | H04W 76/14 |
| 9,439,176 B2* | 9/2016 | Maaref | H04W 4/08 |
| 2014/0016580 A1 | 1/2014 | Kim et al. | |
| 2014/0098731 A1* | 4/2014 | Maaref | H04W 72/121 |
| | | | 370/312 |
| 2014/0113643 A1* | 4/2014 | Ma | H04W 28/16 |
| | | | 455/452.1 |
| 2015/0016361 A1* | 1/2015 | Kim | H04J 11/004 |
| | | | 370/329 |
| 2015/0146668 A1 | 5/2015 | Liu et al. | |
| 2016/0036565 A1 | 2/2016 | Maaref et al. | |
| 2016/0173239 A1* | 6/2016 | Kim | H04L 1/1812 |
| | | | 370/329 |
| 2016/0197760 A1* | 7/2016 | Larsson | H04L 1/0003 |
| | | | 375/298 |
| 2017/0171897 A1* | 6/2017 | Ryu | H04L 5/0044 |
| 2018/0123765 A1* | 5/2018 | Cao | H04L 1/1893 |
| 2018/0227882 A1* | 8/2018 | Freda | H04W 8/005 |
| 2019/0082428 A1 | 3/2019 | Maaref et al. | |

FOREIGN PATENT DOCUMENTS

| | | | |
|---|---|---|---|
| CN | 103718526 B | 6/2017 | |
| EP | 2879414 A1 | 6/2015 | |
| JP | 2010166348 A | 7/2010 | |
| WO | 2013038865 A1 | 3/2013 | |
| WO | 2013085127 A1 | 6/2013 | |
| WO | WO-2014053102 A1 * | 4/2014 | H04W 88/04 |

OTHER PUBLICATIONS

Huawei et al.,"Sidelink Support and Enhancements for NR",3GPP TSG RAN WG1 Meeting #86 R1-167207, Gothenburg, Sweden, Aug. 22-26, 2016,total 7 pages.

* cited by examiner

SYSTEM AND METHOD FOR GROUP-ASSISTED DOWNLINK TRANSMISSION

FIELD

The present application relates to wireless communication, and more particularly to user equipment assisting with a downlink transmission from the network.

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources.

In a traditional wireless communication system, all messages between two UEs pass through at least one base station, even if the two UEs communicating with each other are in close physical proximity. Device-to-device (D2D) communication has more recently been introduced to allow for UEs in close proximity to directly communicate with each other without using a base station. A group of UEs may form a D2D group and then communicate with one another using D2D communication.

As the number of UEs in a wireless communication system increases, there may be more potential opportunities for using D2D communication.

SUMMARY

One or more base stations of the network may have data to send to a target UE in a D2D group. It is desired to use the D2D group to help facilitate the downlink transmission of the data to the target UE. It may also be desired to have the network indicate to the D2D group which UEs in the D2D group are to actually assist the target UE in receiving the downlink transmission of the data.

In one embodiment, there is provided a method for a UE to receive data. The method includes receiving control information in a downlink control channel. The control information may at least indicate a time-frequency resource partition in a downlink data channel at which the data is located. At least a portion of the control information may be masked with a group ID known to the UE and at least one other UE. The method may further include the UE using the group ID to unmask the at least the portion of the control information. The method may further include the UE obtaining an indication of at least the time-frequency resource partition from the control information. The method may further include the UE receiving the data in the downlink data channel at the time-frequency resource partition.

In some embodiments, the UE is a cooperating UE that is to assist a target UE with receipt of the data. The UE uses D2D communication to transmit information to the target UE. The information may be at least one of: the data, a re-encoded version of the data, and other information obtained when decoding the data. Therefore, advantageously, in some embodiments the target UE may be assisted with the downlink transmission of the data to the target UE.

In some embodiments, the UE receives a message indicating that the UE is to assist the target UE with receipt of the data. Therefore, advantageously, in some embodiments a network may indicate when the UE is to assist the target UE with receipt of the data.

In another embodiment, there is provided a method for a network to transmit data. The data is for reception by a plurality of UEs. The method may include masking at least a portion of control information with a group ID known to the plurality of UEs. The control information may at least indicate a time-frequency resource partition in a downlink data channel at which the data is located. The method may further include transmitting the control information in a downlink control channel. The method may further include transmitting the data in the downlink data channel at the time-frequency resource partition.

In some embodiments, the plurality of UEs are a D2D communication group known to the network. Therefore, advantageously, in some embodiments a network may communicate with a D2D group using the group ID.

In some embodiments, the D2D communication group includes a target UE and a plurality of potential cooperating UEs. A message may be transmitted to each potential cooperating UE. The message may indicate whether or not the potential cooperating UE is to assist the target UE with receipt of the data. Therefore, advantageously, in some embodiments the target UE may be assisted with the downlink transmission of the data, and the network may indicate which UEs are to assist the target UE with receipt of the data.

In another embodiment, a UE and network are disclosed for performing the methods above and herein.

Other aspects and features will become apparent to those of ordinary skill in the art upon review of the following description.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Figure 1:
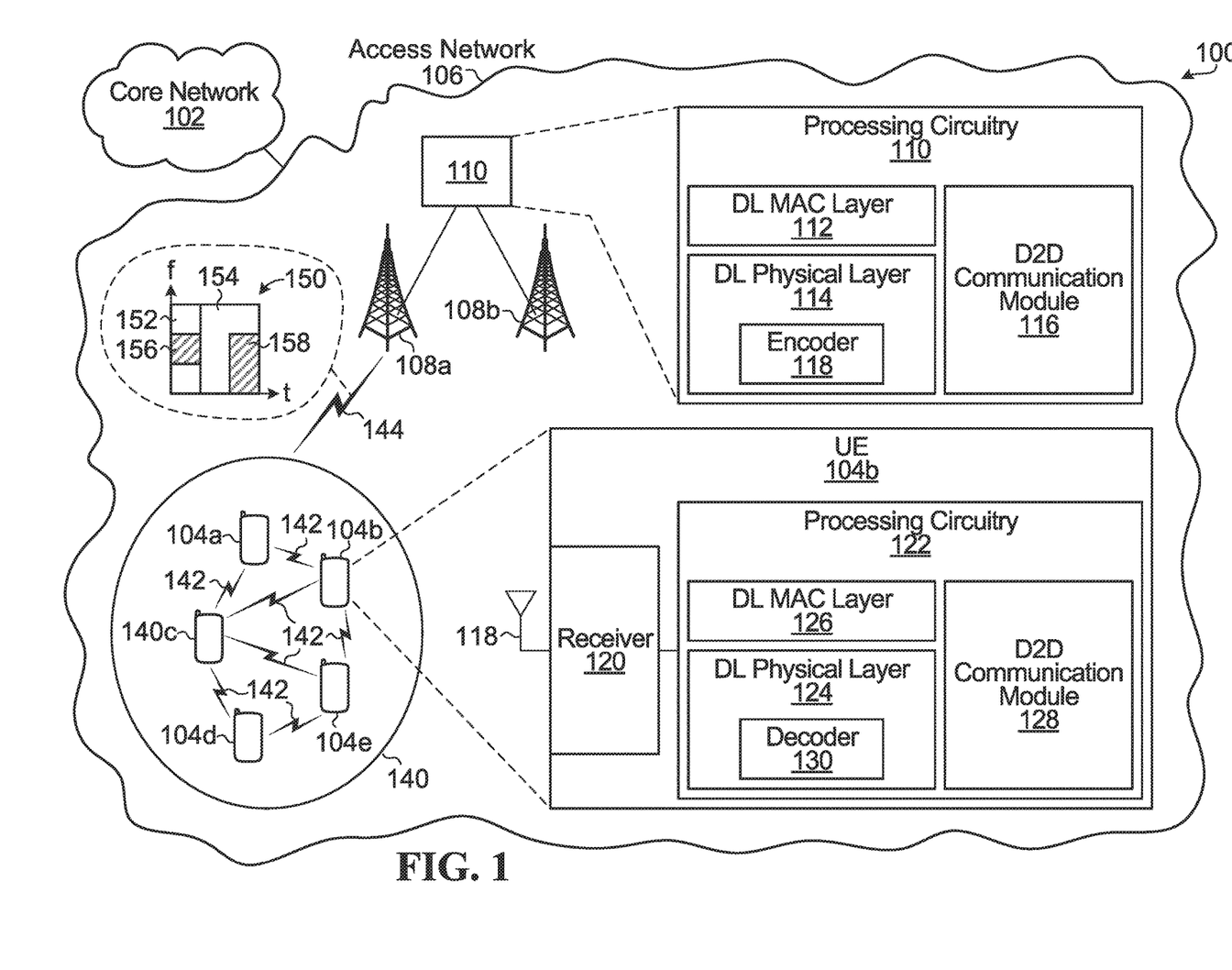
FIG. 1 is a block diagram of a telecommunications network according to one embodiment.

FIG. 1 is a block diagram of a telecommunications network 100 according to one embodiment. The telecommunications network 100 includes a core network 102 and an access network 106. The access network 106 serves a plurality of UEs, including UEs 104*a*, 104*b*. 104*c*. 104*d*, and 104*e*. As one example, the access network 106 may be an Evolved Universal Terrestrial Access (E-UTRA) network. As another example, the access network 106 may be a cloud access network (C-RAN). The access network 106 has a plurality of base stations, including base stations 108*a* and 108*b*. The access network 106 may include other UEs and other base stations, but these have been omitted for the sake of clarity.

Each of the base stations 108*a* and 108*b* may be implemented using a radio transceiver, one or more antennas, and associated processing circuitry, such as antenna radio frequency (RF) circuitry, analog-to-digital/digital-to-analog converters, etc. Although not illustrated, the base stations 108*a* and 108*b* are communicably coupled to the core network 102, either directly or through one or more central processing hubs, such as servers. The base stations 108*a* and 108*b* may serve as the gateway between the wireline and wireless portion of the access network 106.

The word "base station" encompasses any device that wirelessly transmits data in the downlink to UEs. Therefore, in some implementations, the base stations 108*a* and 108*b* may each be called other names instead, such as a base transceiver station, a radio base station, a network node, an access point, a transmit node, a NodeB, an evolved Node B ("eNodeB"), a relay station, a remote radio head, a transmit point, or a transmit and receive point. Also, in some embodiments, the components of the base stations 108*a* and 108*b* are distributed.

In the example in FIG. 1, the base stations 108*a* and 108*b* are communicably coupled to processing circuitry 110 in the access network 106. The processing circuitry 110 may reside on one or more servers in the access network 106. In some implementations, the processing circuitry 110 may be called a baseband unit (BBU). The processing circuitry 110 implements modules and processing blocks associated with the base stations 108*a* and 108*b*, such as the downlink (DL) medium access control (MAC) layer 112, the DL physical layer 114, and a D2D communication module 116. The processing circuitry 110 may implement other processing operations. The DL MAC layer 112 implements downlink MAC operations associated with the base stations 108*a* and 108*b*, such as generating the MAC packet data units (PDUs) and MAC control elements (CEs) described later. The DL physical layer 114 implements downlink physical layer processing blocks associated with the base stations 108*a* and 108*b*, such as an encoder 118 for masking control information with an identification (ID) in the manner described later. Other downlink physical layer operations may include error detection/correction coding, modulation, etc. The D2D communication module 116 implements operations relating to network-assisted D2D communication between UEs, such as associating a D2D group with a D2D group ID and dynamically selecting a cooperation active set, as described later.

In the example in FIG. 1, the processing relating to the base stations 108*a* and 108*b* is performed using processing circuitry 110, and the base stations 108*a* and 108*b* house the antennas and RF circuitry. Alternatively, some of the operations performed by the processing circuitry 110, e.g. the physical layer operations, may instead be performed locally at each base station 108*a* and 108*b*.

The processing circuitry 110 and the processing blocks and modules it implements, such as the MAC layer 112, physical layer 114, and the D2D communication module 116, may be implemented as follows. Instructions may be stored on a memory (not illustrated), and a processor (not illustrated) may then execute the instructions. The instructions define the operations performed by the processing circuitry 110. The processor performs the operations when the instructions are executed by the processor. Alternatively, some or all of the processing circuitry 110 may be implemented using dedicated integrated circuitry, such as an application specific integrated circuit (ASIC), a graphics processing unit (GPU), or a programmed field programmable gate array (FPGA) for performing the operations of the processing circuitry 110. The operations of the processing circuitry 110 include the network-side operations described later.

UE 104*b* is illustrated in more detail in FIG. 1. The other UEs have a similar structure. UE 104*b* includes one or more antennas. Only one antenna 118 is illustrated in FIG. 1 for clarity. The one or more antennas are coupled to a receiver 120, which may be part of a transceiver. UE processing circuitry 122 is coupled to the receiver 120. The processing circuitry 122 implements modules and processing blocks associated with the UE 104*a*, such as the DL physical layer 124, the DL MAC layer 126, and a D2D communication module 128. The processing circuitry 122 may also implement other processing operations. The DL physical layer 124 implements downlink physical layer processing blocks of the UE 104*b*, such as a decoder 130 for unmasking control information using an ID in the manner described later. Other downlink physical layer operations may include error detection/correction, demodulation, etc. The DL MAC layer 126 implements downlink MAC operations of the UE 104*b*, such as processing MAC PDUs and MAC CEs in the manner described later. The D2D communication module 128 implements operations relating to D2D communication between UEs, such as associating a D2D group with a D2D group ID, instructing the UE to send information to one or more other UEs using D2D communication, and processing received D2D communications from other UEs.

Although the UE processing circuitry 122 is illustrated as being coupled to the receiver 120, alternatively some or all of the processing circuitry 122 may be integrated within or part of the receiver 120.

The processing circuitry 122 and the processing blocks and modules it implements, such as the MAC layer 126, physical layer 124, and the D2D communication module 128, may be implemented as follows. Instructions may be stored on a memory (not illustrated) of the UE, and a processor (not illustrated) of the UE may then execute the instructions. The instructions define the operations performed by the processing circuitry 122. The processor performs the operations when the instructions are executed by the processor. Alternatively, some or all of the processing circuitry 122 may be implemented using dedicated integrated circuitry, such as an ASIC. GPU, or FPGA for performing the operations of the processing circuitry 122. The operations of the processing circuitry 122 include the UE-side operations described later.

UEs 104*a-e* are in close proximity to each other. Although the UEs 104*a-e* can each wirelessly communicate with the base stations 108*a* and/or 108*b*, they can also directly communicate with each other using D2D communications 142. UEs 104*a-e* therefore form a D2D group 140, which may be established in the manner described later.

A D2D communication is a direct communication between UEs that does not go through an access network component, such as a base station. Instead, a D2D communication goes through a D2D communication interface. As shown in FIG. 1, D2D communications 142 are directly between the UEs 104*a-e* and are not routed through base station 108*a*, base station 108*b*, or any other part of the access network 106. D2D communications 142 may also be referred to as lateral communications. D2D communications use a sidelink channel and a sidelink D2D air interface. In contrast, a communication between an access network component, such as base station 108*a*, and one or more UEs, as in communication 144, is called an access communication. An access communication may also be called an infrastructure-to-device (I2D) communication. An access communication occurs over an access channel, which can be an uplink or downlink channel. An access communication uses a radio access communication interface, such as a cellular radio access air interface. Access and D2D air interfaces may use different transmission formats, such as different waveforms, different multiple access schemes, and/or different radio access technologies. Some examples of radio access technologies that may be used by an access air interface and/or a D2D air interface are: Long Term Evolution (LTE), LTE License Assisted Access (LTE-LAA), and WiFi. D2D communications may be over Wi-Fi or Bluetooth™, or D2D communications may utilize uplink and/or downlink resources, such as time slots and/or frequencies, which may be scheduled by the network 106. The D2D communications may be over licensed or unlicensed spectrum.

During operation, the UEs 104*a-e* access the telecommunications network 100 using the access network 106 by wirelessly communicating with base station 108*a* and/or 108*b*. However, by also using the D2D communications 142, the UEs 104*a-e* may be able to assist with wireless communications between the UEs 104*a-e* and base station 108*a* and/or 108*b*. As one example, if UE 104*e* fails to correctly decode a packet received from the base station 108*a*, but if UE 104*b* is able to receive and correctly decode the packet from the base station 108*a*, then UE 104*b* could directly transmit the decoded packet to UE 104*e* using D2D communications 142. As another example, if UE 104*e* moves out of the wireless coverage area of base stations 108*a* and 108*b*, such that UE 104*e* can no longer wirelessly communicate with base station 108*a* or 108*b*, then UEs 104*a* and 104*c* may relay messages between the UE 104*e* and the base station 108*a*. As another example, UE 104*c* and UE 104*e* may both receive a signal transmitted from the base station 108*a* that carries a packet meant for UE 104*e*. UE 104*c* may then transmit to UE 104*e*, via D2D communications 142, the signal as received by UE 104*c*. UE 104*e* may then use the information received from UE 104*c* to help decode the packet from the base station 108*a*. In these examples, capacity and/or coverage may be enhanced through the assistance of D2D communication.

The D2D communication module 116 in the access network 106 may assign a D2D group ID to the D2D group 140. The D2D group ID may allow the access network 106 to address the D2D group 140 as a whole and distinguish the D2D group 140 from other D2D groups. The D2D group ID may also be used to broadcast information within the D2D group, i.e. address all UEs within the D2D group 140. The D2D group 140 may form a logical or virtual device mesh in which the members of the D2D group 140 communicate amongst themselves using D2D communications over a D2D air interface, but the D2D group 140 as a whole acts as a single distributed virtual transceiver with respect to the access network 106. In some embodiments, the D2D group ID may be a group radio network temporary identifier (G-RNTI).

When a particular UE in the D2D group 120 is being assisted or is to be assisted with wireless communication between that UE and a base station, then that particular UE is referred to as a target UE. In the examples herein. UE 104*e* is being assisted and so is a target UE. Therefore, target UE 104*e* is labelled with a "T" in FIG. 1. The other UEs 104*a-d* in the D2D group 140 form a cooperation candidate set (CCS), which is a set of UEs that may cooperate to help the target UEs. The subset of UEs in the cooperation candidate set that actually assist a target UE form a cooperation active set (CAS). The cooperation active set may be dynamically selected to assist target UE 104*e*, as described in more detail below. The UEs in the cooperation active set are referred to as cooperating UEs (CUEs). In D2D group 140. UEs 104*a-d* form the cooperation candidate set. If UEs 104*a* and 104*b* actually assist target UE 104*e*, then UEs 104*a* and 104*b* form the cooperation active set and are the cooperating UEs. In some embodiments, one or more of the cooperating UEs may be a "dummy UE", which is a UE that is more powerful than a regular UE, e.g. a dummy UE may have more antennas, more computational power, larger bandwidth, more battery, etc. than a regular UE. In some embodiments, the dummy UE may not belong to a particular user (i.e. customer), but instead to the network service provider. The dummy UE may be specifically deployed by the user (i.e. customer) or the network operator, in coverage areas of interest and act as a cooperating UE. For example, a dummy UE may be placed in a crowded location at an event.

Although only one target UE is illustrated in FIG. 1, a D2D group may instead have more than one target UE. Also, the one or more UEs in a D2D group that are a target UE may change over time. A target UE may later become a cooperating UE. Also, if there is more than one target UE in a D2D group, one target UE may be a cooperating UE for another target UE.

As UEs 104*a-e* move around, some may leave the D2D group 140 and/or other UEs may join the D2D group 140. Therefore, the cooperation candidate set may change over time, e.g., the cooperation candidate set may change semi-statically. The D2D group 140 may also be terminated by the access network 106, e.g., if the access network 106 determines that there is no longer a need or opportunity for the D2D group 140 to provide assistance in wireless communication between the network 106 and members of the D2D group 140.

There may be more than one D2D group, but only one D2D group has been illustrated in FIG. 1 for the sake of clarity.

FIG. 1 also illustrates a downlink transmission 144 from base station 108*a* to UEs of the D2D group 140. The downlink transmission is sent using resources, for example time-frequency resources. An example of time-frequency resources is indicated at 150. Certain partitions of the resources may carry control information, whereas other partitions of the resources may carry data for one or more UEs. The partition of time-frequency resources carrying the control information will be called the control channel, and the partition of time-frequency resources carrying the data for UEs will be referred to as the data channel. An example of a control channel is the physical downlink control channel (PDCCH), and an example of a data channel is the physical downlink shared channel (PDSCH).

An example logical partition of time-frequency resources into a downlink control channel 152 and a downlink data channel 154 is illustrated in FIG. 1. Resource partition 156 is illustrated, and is used to transmit downlink control information (DCI) for UE 104*b*. The DCI indicates the resource allocation for the data for UE 104*b*, i.e. time-frequency resource partition 158 in the data channel 154 at which data for UE 104*b* is located. The control information may also indicate the transmission format of the data sent in the time-frequency resource partition 158. e.g. the modulation and coding scheme (MCS), and/or hybrid automatic repeat request (HARQ) information, and/or multiple-input-multiple-output (MIMO) specific signaling.

The processing circuitry 122 of UE 104*b* processes the control information received at resource partition 156 and then uses the control information to decode the data sent for it at resource partition 158.

The control information for UE 104*b* may be prepared and received as follows. The encoder 118 in the network 106 may mask at least a portion of the control information with the ID of UE 104*b*. The masking may involve modifying at least some of the control information using the ID of UE 104*b*. As an example, the cyclic redundancy check (CRC) of the control information may be masked by scrambling the CRC with the ID of UE 104*b*. UE 104*b* does not know the time-frequency partition carrying its control information, and so the decoder 130 of UE 104*b* blindly decodes control information in the control channel 152 and tries to unscramble the CRC using the ID of UE 104*b*. An incorrect CRC is interpreted by the UE 104*b* as an indication that that particular control information in the control channel 154 is not meant for UE 104*b*. The UE 104*b* continues to blindly decode other control information in the control channel 154, with the CRC unscrambling using the ID of UE 104*b*. The decoding of the control information at resource partition 156 results in a correct CRC. The decoded control information then provides the information required for UE 104*b* to locate and decode its data at resource partition 158 in the data channel 154.

D2D Group Establishment

For D2D group 140 to exist, the D2D group 140 must first be established. The D2D group 140 may be established in many different ways. One example is described below.

Figure 2:
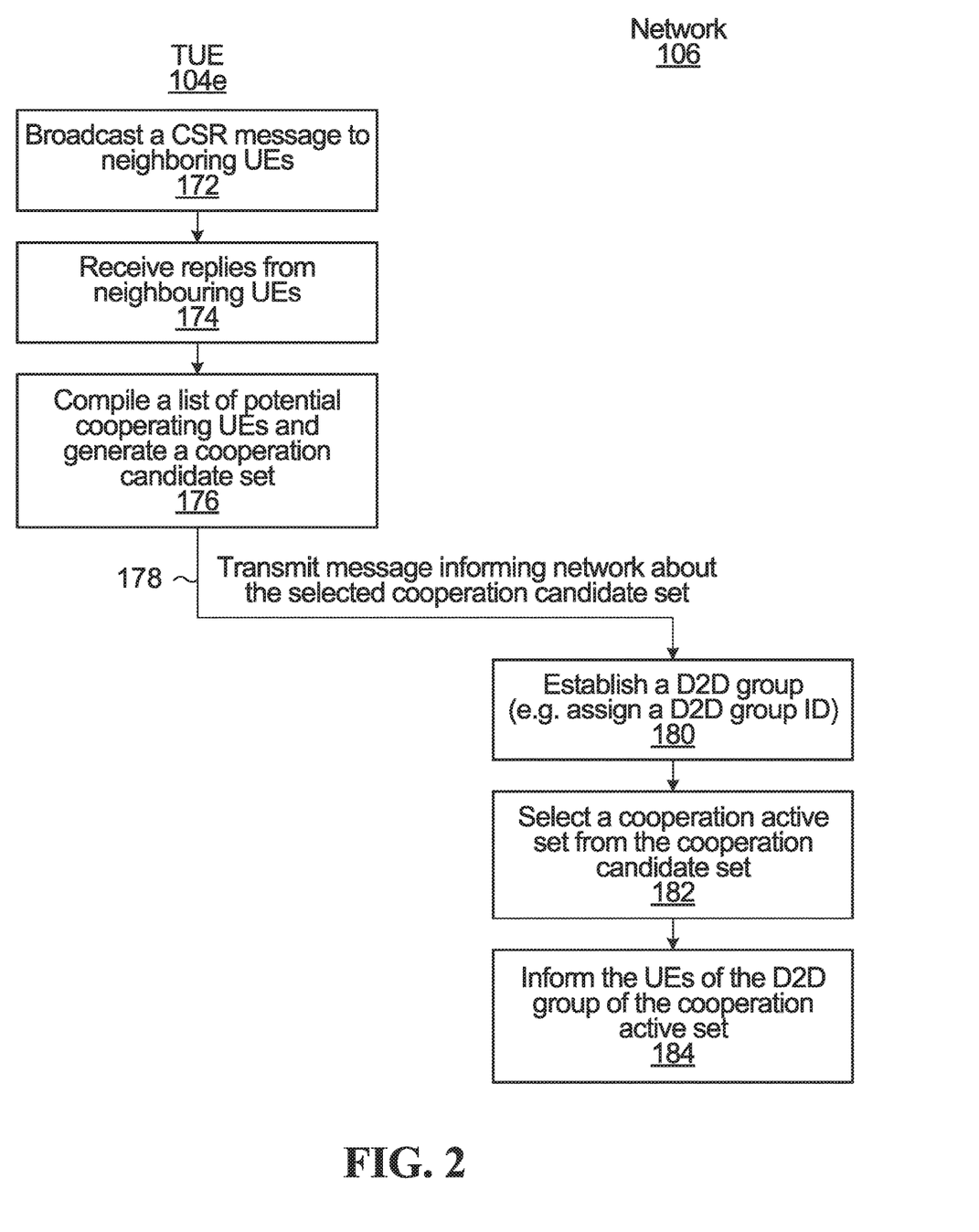
FIG. 2 is a flowchart of operations performed by a target UE and the network, according to one embodiment.

FIG. 2 is a flowchart of operations performed by target UE (TUE) 104*e* and the network 106, according to one embodiment. TUE 104*e* seeks to form a D2D group 140 that may act as a virtual multipoint transceiver. Therefore, in step 172, TUE 104*e* first broadcasts a cooperation seeking request (CSR) message to neighboring UEs, e.g. UEs within the transmission range of TUE 104*e*. The decision to form the D2D group may be triggered by the TUE 104*e* itself in the D2D communication module 128, or by a network controller implemented by processing circuitry 110 in the network 106. The network controller may be part of the D2D communication module 116. For example, the network controller may instruct the TUE 104*e* to from a D2D group based on channel quality measurements (e.g., a channel quality indicator (CQI) report) of the TUE 104*e*, retransmission times of the TUE 104*e*, retransmission frequency of the TUE 104*e*, or the like. The TUE 104*e* may multicast the CSR message over D2D links.

In step 174, the TUE 104*e* receives replies from UEs capable of and willing to form a D2D group with the TUE 104*e*. The replies are received from at least UEs 104*a-d*.

In step 176, the D2D module 128 in TUE 104*e* compiles a list of potential cooperating UEs and generates a cooperation candidate set. The potential cooperating UEs may be selected, for example, based on relatively simple selection criteria, such as the content and/or strength of received replies to the CSR message, physical proximity to the TUE 104*e*, network associations (e.g., being connected to a same network or a different network), or the like. The cooperation candidate set includes UEs 104*a-d*.

In step 178, the TUE 104*e* informs the network 106 about the selected cooperation candidate set by transmitting a message to base station 108*a* and/or 108*b*. Cooperation candidate sets may be TUE-specific. Therefore, different TUEs accessing the network 106 may select different cooperation candidate sets.

In step 180, the D2D group 140 is established in the network 106. e.g. by the D2D module 116 assigning a D2D group ID to the D2D group 140. The group ID may be transmitted to each UE in the D2D group 140. The D2D group 140 includes UEs 104*a-d* as the cooperation candidate set to possibly assist target UE 104*e*.

In step 182, the D2D module 116 in the network 106 selects a cooperation active set from the cooperation candidate set. The cooperation active set includes some or all of UEs 104*a-d*. The UEs in the cooperation active set may be selected based on one or a combination of the following parameters for each potential cooperating UE to be added to the cooperation active set: predicted availability of the potential cooperating UE, e.g., based on UE traffic load; access link quality between the potential cooperating UE and base station 108*a* and/or 108*b*; MIMO decoding capability of the potential cooperating UE; number of reception antennas of the potential cooperating UE; mobility of the potential cooperating UE; battery level of the potential cooperating UE; a CQI report of the potential cooperating UE; D2D quality between the potential CUE and the TUE 104*e*.

In step 184, the network informs the UEs 104*a-e* of the cooperation active set, e.g. by using base station 108*a* and/or 108*b* to send a downlink transmission to the UEs 104*a-e*. The cooperation active set is the set of cooperating UEs, which together with the TUE 104*e* form a virtual multipoint transceiver. When there are multiple TUEs, each having its own cooperation candidate set, the network 106 may select a different cooperation active set for each respective cooperation candidate set.

The cooperation active set may be dynamically adjusted by the D2D module 116 of the network 106. For example, the cooperation active set may initially contain only UEs 104*b* and 104*c*, in which case only UEs 104*b* and 104*c* assist TUE 104*e* with receipt of a downlink transmission from the network 106. Later in time. e.g. due to changing channel conditions or UE processing availability, the cooperation active set may be changed to only include UEs 104*a* and 104*b*, in which case only UEs 104*a* and 104*b* assist TUE 104*e* with receipt of a downlink transmission from the network 106.

Different methods may be used to dynamically inform the UEs 104*a-e* in the D2D group 140, over time, which UEs are to be added and removed from the cooperation active set. Some specific examples involving use of a MAC CE are described later.

Note that the specific operations in FIG. 2 are only one example. Different variations are possible. As one example, steps 174 to 178 in FIG. 2 may be replaced with the following operations instead: UEs capable of and willing to form a D2D group with the TUE 104*e* send a report message indicating this to the network 106, and the network 106 then compiles a list of potential cooperating UEs and generates a cooperation candidate set for the TUE 104*e*. Also, FIG. 2 shows both the operations of the TUE 104*e* and the operations of the network 106 all on the same drawing sheet. However, steps 172 to 178 are separate from steps 180 to 184. From the perspective of the TUE 104*e*, only steps 172 to 178 are performed. From the perspective of the network 106, only steps 180 to 184 are performed. It is not essential that the steps of the TUE 104*e* and the steps of the network 106 be considered together.

Downlink Multicast Transmission

The network 106 may have data to send to the TUE 104e. The data may originate from the radio bearer of the TUE 104e. As one example, the data may have arrived at the access network 106 from the core network 102, e.g. from the system architecture evolution (SAE), which is a flat all-IP architecture that may be optimized for minimizing latency.

Figure 3:
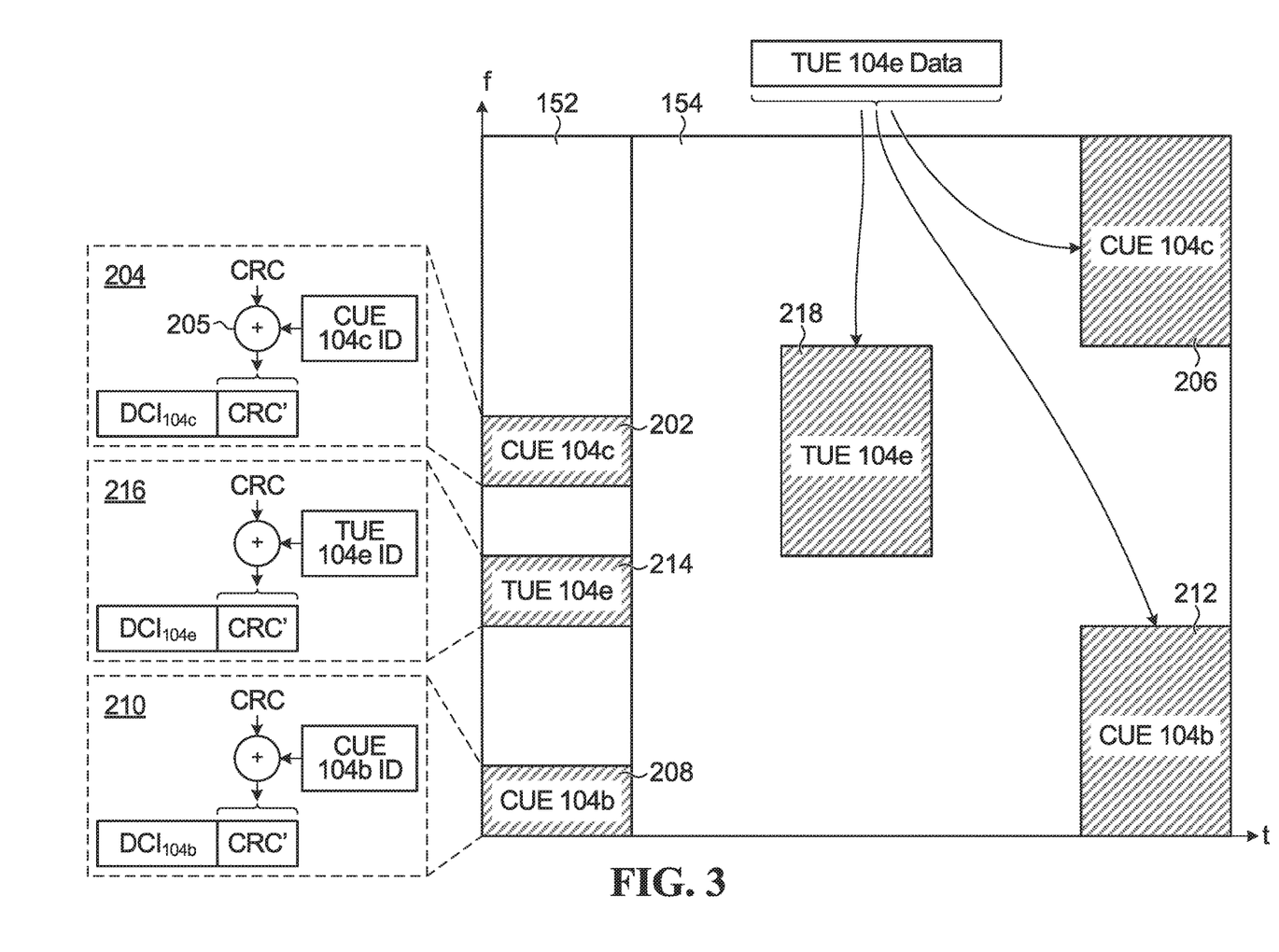
FIG. 3 illustrates an example time-frequency resource allocation in which data for a target UE is duplicated and sent over multiple UE-specific resource partitions.

When the access network 106 transmits TUE 104e's data to TUE 104e, the cooperation active set of the D2D group 140 is to assist in the receipt of the data by the TUE 104e. One method is for the network 106 to also send the data to each UE in the cooperation active set in a UE-specific downlink transmission. Each cooperating UE can then use D2D communication to forward information to TUE 104e, such as the decoded data, a re-encoded version of the data or other information obtained during the decoding process. However, sending the data to each UE in the cooperation active set in a UE-specific downlink transmission may be an inefficient use of resources. For example, FIG. 3 illustrates a time-frequency resource allocation in which a first logical partition of resources form the downlink control channel 152 and a second logical partition of resources form the downlink data channel 154. In the example of FIG. 3, UEs 104b and 104c form the cooperation active set and are therefore cooperating UEs (CUEs). The control channel 154 includes control information $DCI_{104c}$ for CUE 104c at resource partition 202. At least a portion of the control information for CUE 104c is masked, using the ID of the CUE 104c, by the processing circuitry 110 of the network 106. In this example, the CRC of $DCI_{104c}$ is masked by scrambling the CRC of $DCI_{104c}$ with the ID of CUE 104c, as shown at 204. Specifically, the masking occurs by XORing the CRC with a bitmask comprising the ID of CUE 104c, as shown at 205.

During operation, the CUE 104c uses its ID to unmask the CRC and obtains the control information payload, i.e., the $DCI_{104c}$. The $DCI_{104c}$ is used by the CUE 104c for locating and decoding the associated data in the data channel 154. The $DCI_{104c}$ indicates, among other things, the time-frequency resource partition 206 in the data channel 154 at which the data for CUE 104c is located. The CUE 104c obtains and attempts to decode the data at resource partition 206. The data is for TUE 104e and so the CUE 104c assists the TUE 104e with the receipt of the data by forwarding information to the TUE 104e over a D2D link between CUE 104c and TUE 104e. The information may be, for example, the decoded data or a re-encoded version of the decoded data.

The data for TUE 104e is also sent to CUE 104b, and a similar operation is performed by CUE 104b: CUE 104b uses its ID to unmask $DCI_{104b}$ at resource partition 208, as shown at 210. The $DCI_{104b}$ indicates the time-frequency resource partition 212 at which the data for CUE 104b is located. The CUE 104b obtains and attempts to decode the data at resource partition 212. The data is for TUE 104e, and so information (such as the decoded data) may be forwarded to TUE 104e over a D2D link between CUE 104b and TUE 104e. The data for TUE 104e is also sent to TUE 104e. TUE 104e uses its ID to unmask $DCI_{104e}$ at resource partition 214, as shown at 216. The $DCI_{104e}$ indicates the time-frequency resource partition 218 at which the data for TUE 104e is located. The TUE 104e obtains its data at resource partition 218 and attempts to decode it, possibly with the assistance of the information received from CUE 104b and/or CUE 104c.

In FIG. 3, the data for TUE 104e is multicast to TUE 104e, CUE 104b, and CUE 104c using dedicated resources for each transmission of the data. The TUE 104e data is duplicated proportionally to the number of CUEs, and the network allocates resources separately to each CUE. This may introduce latency or scalability problems.

An alternative method is to perform the multicasting using the D2D group ID, which results in one resource partition in the control channel for the DCI relating to the TUE 104e data, as well as one corresponding resource partition in the data channel for the TUE 104e data.

Figure 4:
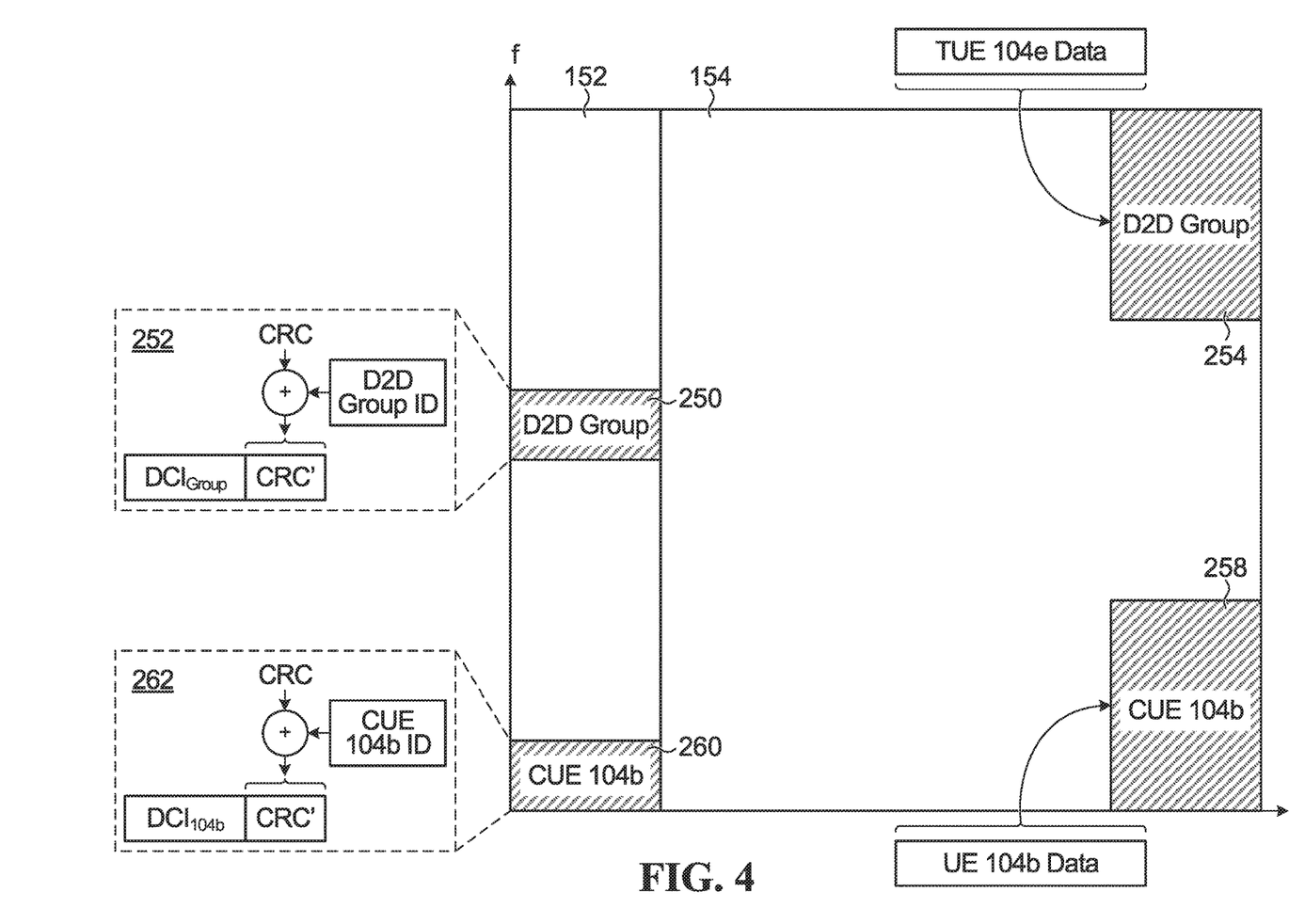
FIG. 4 illustrates an example time-frequency resource allocation in which the data is instead sent as a group-assisted downlink data transmission on a single resource partition.

FIG. 4 illustrates an example time-frequency resource allocation having downlink control channel 152 and downlink data channel 154. However, in FIG. 4, the multicasted TUE 104e data is only transmitted once on the data channel 154, on resource partition 254. The downlink data transmission on resource partition 254 will be referred to as a group-assisted downlink data transmission. Control information $DCI_{Group}$ is associated with the group-assisted downlink data transmission. The control information $DCI_{Group}$ is located at resource partition 250 of the control channel 152. At least a portion of $DCI_{Group}$ is masked with the D2D group ID using encoder 118, e.g by scrambling a CRC of $DCI_{Group}$, as shown at 252. The $DCI_{Group}$ includes an indication of the time-frequency resource partition 254 in the data channel 154, and may include other parameters that are needed to decode the group-assisted downlink data transmission and that relate to the transmission format of the group-assisted downlink data transmission, such the MCS of the data, and/or HARQ information (such as the redundancy version), and/or MIMO specific signaling.

During operation, the decoder 130 of a UE in the D2D group 140 can perform blind decoding on the control channel 152 with unmasking using the D2D group ID. e.g. by unscrambling the CRC using the group ID by performing an XOR operation between the masked CRC and the group ID. When the unmasking using the group ID is successful (e.g. the unscrambled CRC results in a correct CRC value match), then the $DCI_{Group}$ may be used to locate, receive, and attempt to decode, using the decoder 130, the TUE 104e data at resource partition 254. If the UE is a CUE, then the following information may be sent by the receiver 120 to the TUE 104e using a D2D link: the decoded TUE 104e data; and/or a re-encoded version of the TUE 104e data (e.g. the CUE may re-encode the decoded TUE 104e data using another HARQ redundancy version); and/or other information obtained from decoding or attempting to decode the TUE 104e data (e.g. the signal as received by the CUE, or partially decoded hard or soft information relating to the TUE 104e data). The transmission of the information on the D2D link may be a unicast transmission if the CUE knows the ID of the TUE 104e. Alternatively, the CUE may instead multicast or broadcast the information using the group ID within the D2D group 140 using short-range communication, e.g. via a sidelink channel, if the CUE does not know the ID of the TUE 104e.

Because the encoder 118 in the network 106 uses the group ID to mask at least a portion of control information associated with a multicast transmission at a resource partition in the data channel. e.g. as described above in relation to FIG. 4, the following possible benefits may be achieved. Fewer resources may be needed for the multicast since each UE can receive the data using the same resource partition (e.g. resource partition 254 in FIG. 4). The same protocol stack may be used as for UE-specific transmissions since the use of the group ID itself can indicate that the data is a UE-assisted data transmission. When a CUE receives the data, the CUE knows by virtue of the use of the group ID that it is data meant for a TUE assisted by the CUE. When a TUE receives the data, the TUE knows by virtue of the use of the group ID that it is data for which the TUE will receive assistance from a CUE. In some embodiments, since the data originates from the radio bearer of the TUE, the CUE would not be charged by a service provider for receiving the data. Only the TUE is charged.

Additionally, by using the group ID, group-assisted TUE data may be multiplexed by the processing circuitry 110 with other UE-specific data in the time-frequency resources during scheduling by the processing circuitry 110 of the network 106. FIG. 4 illustrates an example in which CUE 104b also receives a unicast transmission of data specifically for CUE 104b at resource partition 258. Control information $DCI_{104b}$ is present at resource partition 260 in control channel 152, and the CRC of $DCI_{104b}$ is masked by the encoder 118 of the network 106 with the UE ID of CUE 104b, as shown at 262.

Therefore, during operation, each UE in the D2D group, including the TUE, may use its decoder 130 to perform blind decoding of the control channel 152 with unmasking using the group ID to determine whether there is a D2D group assisted downlink data transmission. Each UE in the D2D group, including the TUE, may also use its decoder 130 to perform blind decoding of the control channel 152 using its own ID to determine whether there is any unicast non-group-assisted downlink data transmission meant for it.

Signaling the Cooperation Active Set

In some embodiments, the network 106 may dynamically signal the cooperation active set. There are different ways in which this may be achieved, such as by including a message in a downlink control channel or a downlink data channel. One example is described below.

With reference to FIG. 4, when the group-assisted data is prepared for multicast transmission on the resource partition 254, a MAC PDU may be generated by the downlink MAC layer 112 of the network 106. The MAC PDU includes a payload having the data from the core network data radio bearer of the TUE 104e, along with a logical channel ID (LCID) corresponding to the TUE 104e data radio bearer. The MAC PDU is multicast through the downlink channel using the D2D group ID in the manner explained above in relation to FIG. 4. However, the processing circuitry 110 of the network 106 may also include in the MAC PDU a MAC sub-header and control element (CE) indicating which UEs in the D2D group 140 are to be part of the cooperation active set.

Figure 5:
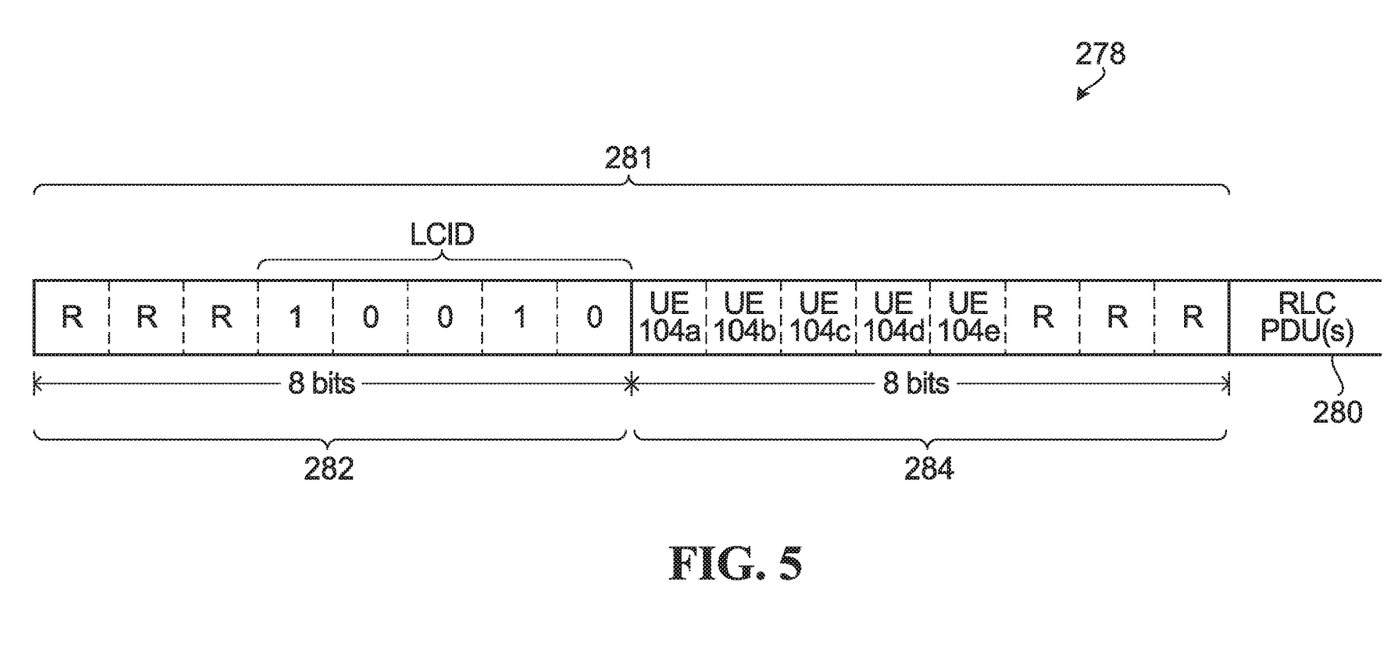
FIG. 5 illustrates a portion of a MAC PDU, according to one embodiment.

FIG. 5 illustrates a portion of a MAC PDU 278 according to one embodiment. The MAC PDU 278 may also be called a transport block (TB). The MAC PDU 278 may be sent on resource partition 254 of FIG. 4.

The MAC PDU 278 includes one or several radio link control (RLC) PDU(s) 280. The MAC PDU 278 further includes a MAC header 281. The MAC PDU 278 may be formed by multiplexing the MAC header 281 with the RLC PDU(s) 280. Although not illustrated, the MAC PDU 278 may also contain padding in order to meet the scheduled TB size.

The MAC header 281 contains at least one MAC sub-header. The MAC header 281 may or may not include one or more MAC CEs. In the illustrated embodiment, the MAC header 281 includes one subheader 282 and one MAC CE 284. This is only a simple example for ease of explanation. Each MAC subheader refers to either one MAC CE or one RLC PDU. A MAC subheader may have different fields, such as a flag field to indicate whether this is the last MAC subheader or not, a LCID field, a length field L to indicate the length of a RLC PDU, and another field to indicate the length of the length field. These last 2 sub-header fields may not be needed for MAC CE because the length of the MAC CE can be fixed, e.g. 1 byte, 2 bytes, etc.

In the illustrated embodiment, the MAC subheader 282 refers to MAC CE 284. The MAC sub-header 282 is 8 bits long and includes a unique LCID e.g. "10010" that specifies that the UE cooperation MAC CE 284 follows. The MAC CE 284 is also 8 bits long and includes a bitmap for the UEs in the D2D group. A bit "1" means the particular UE is to be part of the cooperation active set for MAC PDU 278, whereas a bit "0" means that the particular UE is not to be part of the cooperation active set for MAC PDU 278. The value "R" stands for reserved bit.

During operation, each one of UEs 104a-e uses the group ID to blindly decode the downlink control channel in its decoder 130 in the manner described above, to search for control information corresponding to a group-assisted downlink transmission. The uncovered control information is then used to receive and decode the MAC PDU 278 sent in the downlink data channel. The processing circuitry 122 of the UE may process the MAC CE 284 to determine if the UE is part of the cooperation active set, e.g. by determining whether the bit in the MAC CE 284 corresponding to the UE is set to "1" or "0". If the UE is part of the cooperation active set, then the UE assists the TUE with receipt of the data in the payload of the MAC PDU 278. For example, the UE may forward a decoded or re-encoded version of the MAC PDU 278 (typically without the MAC CE 284) to the TUE. If the UE is not part of the cooperation active set, then the UE discards the MAC PDU 278 and does not assist the TUE with receipt of the data. When the D2D communication module 116 in the network establishes the D2D Group 140, it may preconfigure the mapping between bit positions of the MAC CE 284 and UE IDs within the D2D group 140, and then provide each UE with an indication of which bit location in the MAC CE 284 corresponds to the UE. Signaling of the preconfigured mapping by the network 106 may occur during group formation or through radio resource control (RRC) signaling.

Although not shown in FIG. 5, the MAC CE 284 may include additional information specifying which UE in the D2D group 140 is the TUE that is to be assisted with receipt of the MAC PDU 278. This may be beneficial in embodiments in which there is more than one TUE in a D2D group, or embodiments in which the TUE in the D2D group changes over time.

Instructing a UE to be part of a cooperation active set is referred to as "activating" the UE as a CUE. Instructing a CUE to no longer be part of the cooperation active set is referred to as "deactivating" the CUE. By using the MAC CE 284, the network may activate and deactivate CUEs dynamically and signal the cooperation active set to both the CUEs and the TUE(s) in the D2D Group. With the bitmap in the MAC CE 284, a single activation/deactivation command can activate/deactivate a subset of the CUEs.

In some embodiments, the network may configure a CUE with a deactivation timer, e.g. via RRC signaling. The processing circuitry in the CUE implements a deactivation timer that counts down. When the deactivation timer expires, the CUE is to no longer act as a CUE, i.e., the CUE is to no longer be part of the cooperation active set. In some embodiments, the deactivation timer may be set or reset as follows: if a UE receives an activation/deactivation MAC CE (e.g. CE 284) in subframe # n activating the CUE, then the CUE initializes or reinitializes the deactivation timer associated with the CUE in subframe # n+x. For example, x may equal zero or four.

In general, the deactivation of a CUE may be done via reception of a MAC CE with the corresponding bitmap element zero, or automatically (without explicit signaling exchange) at the expiry of the timer. The initializing/reinitializing of the timer described above is only one example.

Possible Benefits, Other Variations, and General Methods

In embodiments above, the processing circuitry 110 of the network 106 schedules the group-assisted data and its downlink transmission format, and sends the corresponding DCI (partially masked by the D2D group ID) on the downlink control channel. UEs in the D2D group may use their decoder 130 to decode the control channel using the pre-acquired group ID and then decode the group-assisted downlink data on the data channel using the common resource allocation, MCS and HARQ information indicated in the DCI. In some embodiments, the DCI corresponding to the group-assisted downlink data transmission may include control information for the subsequent D2D transmissions of the CUEs and/or the TUE. e.g. resource allocation for the D2D transmissions and/or the MCS of the D2D transmissions, and/or HARQ information relating to the D2D transmissions.

The CUEs can cooperate with a TUE using the group ID and still receive their own unicast traffic data using their UE ID. For example, with reference to FIG. 4, UE 104b may be a CUE that unmasks control information at resource partition 250 using the D2D group ID, and then uses that control information to decode the data for TUE 104e at resource partition 254. UE 104b may also unmask the control information at resource partition 260 using UE 104b ID, and then use that control information to decode the UE 104b data meant for it at resource partition 258.

In some embodiments, the UEs in the D2D group 140 may send channel quality feedback on an uplink channel. e.g. to allow for downlink adaptation of group-assisted downlink data communications. In one embodiment, UEs in the D2D group 140 each send a CQI value to the network 106 in an uplink channel. The D2D communication module 116 of the network 106 then determines the downlink transmission format of the group-assisted downlink communication sent on resource partition 254 based on the CQI values. For example, the D2D communication module 116 may select transmission format parameters, such as the MCS of the group-assisted downlink data, based on the best CQI value reported from the CUEs. As long as at least the CUE with the best CQI can successfully decode the group-assisted downlink data communication, then that CUE can forward the successfully decoded data to the TUE using D2D communication. In another embodiment, the D2D communication module 116 may select the transmission format parameters of the group-assisted downlink data (such as the MCS) using an optimization algorithm that tries to optimize transmission format parameters based on the different CQI values reported from the different CUEs. In some embodiments, the channel quality feedback sent by the UEs on an uplink channel may instead or additionally relate to a channel quality of a D2D sidelink. For example, each of the UEs in the cooperation candidate set may send to the network a measurement of the quality of their D2D channel to the TUE. The D2D communication module 116 may factor this in when determining the transmission format parameters. For example, if a particular CUE has a D2D channel to the TUE that is low quality, then the D2D communication module 116 may ignore the CQI of that particular CUE when choosing the best CQI in the method above.

In embodiments described herein, HARQ is possible for the group-assisted downlink data transmission. The HARQ scheme would need some adaptation compared to the HARQ scheme currently used for UE-specific (non-group assisted) downlink data transmissions. For example, the HARQ scheme may be adapted to operate in the manner described in U.S. Pat. No. 9,172,512.

Group-assisted downlink communication over the data channel 154 may allow for application of efficient link adaptation schemes by the network 106, such as MCS adaptation, use of HARQ, use of MIMO, use of rank adaptation, etc. The network 106 may be able to utilize advanced link adaptation schemes since the uplink feedback channel corresponding to the downlink data is available. Also, the network 106 may perform scheduling on a per subframe basis, thereby possibly yielding more efficient resource utilization.

In embodiments described herein, coordinated multi-point (CoMP) transmissions may be used by the network 106 to communicate with the D2D group 140. FIG. 1 illustrates two base stations 108a and 108b. The D2D group 140 may only communicate with one of base stations 108a or 108b. Alternatively, the D2D group 140 may communicate with both base stations 108a and 108b, such that both base stations 108a and 108b serve the D2D group 140 via CoMP transmissions. The CoMP transmissions may include: joint transmission from base stations 108a and 108b; and/or dynamic point transmission in which the downlink transmission 144 sometimes comes from base station 108a and other times comes from 108b depending upon changing channel conditions; and/or transmit diversity.

In all of the examples described thus far, the D2D group ID is used for group-assisted downlink data transmissions. More generally, the group ID need not be used specifically for D2D group-assisted downlink transmissions, but may be useful for other purposes, e.g. in user-centric non-cell (UCNC) applications. Future protocols are expected to reduce reliance on cell-specific sequences/signals and rely more on UE-oriented measurement. Using a group ID may be useful even in UCNC applications in which there is no D2D group or D2D collaboration. For example, when the base station of a network needs to send the same data (e.g. a same reference signal) to multiple UEs served by the base station, then the base station may send the data on a single resource allocation in the data channel and have control information in the control or data channel (e.g. in the case of enhanced PDCCH) that is masked by the group ID, e.g. as in FIG. 4 but assuming no D2D cooperation. The control information would be masked by the group ID and would provide the information needed to locate, receive, and decode the data. Similarly, reference signals intended to be used for demodulation of control and data channels by the group of users, so called demodulation reference signal (DM-RS), can be precoded with a UE group-specific multi-antenna transmit precoder that may or may not be communicated a priori to the group of users, e.g. shared DM-RS. The shared DM-RS reference-signal sequence (i.e. the actual symbols forming the reference-signal sequence) can be UE group specific, that is the devices in the UE group can be configured with a common parameter that is used to derive the shared DM-RS reference-signal sequence. Such a common parameter can be the group-ID itself or a function of the group-ID.

The use of a group ID in the embodiments above is always in the context of a downlink communication or sidelink communication. However, the group ID may also or instead be used for uplink communications. For example, a plurality of UEs served by a base station and transmitting a group-assisted uplink communication may include the group-assisted uplink data at a particular resource partition in the uplink data channel, after decoding control information corresponding to the group-assisted uplink data on the downlink control channel. At least a portion of the control information may be masked by the group ID and unmasked by the cooperating UEs and TUE. In some communication systems, the uplink transmissions may be grant free, in which case the network may blindly decode the uplink data channel and unmask the CRC with the group ID to obtain the data for the group-assisted uplink transmission. In another embodiment, the group ID may be used by a UE in a D2D group to broadcast or multicast data (e.g. a reference signal) to other UEs in the D2D group via D2D communication over a sidelink channel. The group ID indicates to each UE in the D2D group that the communication is for members of the D2D group.

Therefore, the group ID need not be limited to use in downlink D2D group-assisted communications, but can be used in other applications also, e.g. downlink channel state information reference signal (CSI-RS) measurement in CoMP, and/or for uplink/downlink/sidelink reference signal (RS) scrambling for the purpose of channel acquisition in UCNC applications or short-term measurement for efficient link adaptation.

Figure 6:
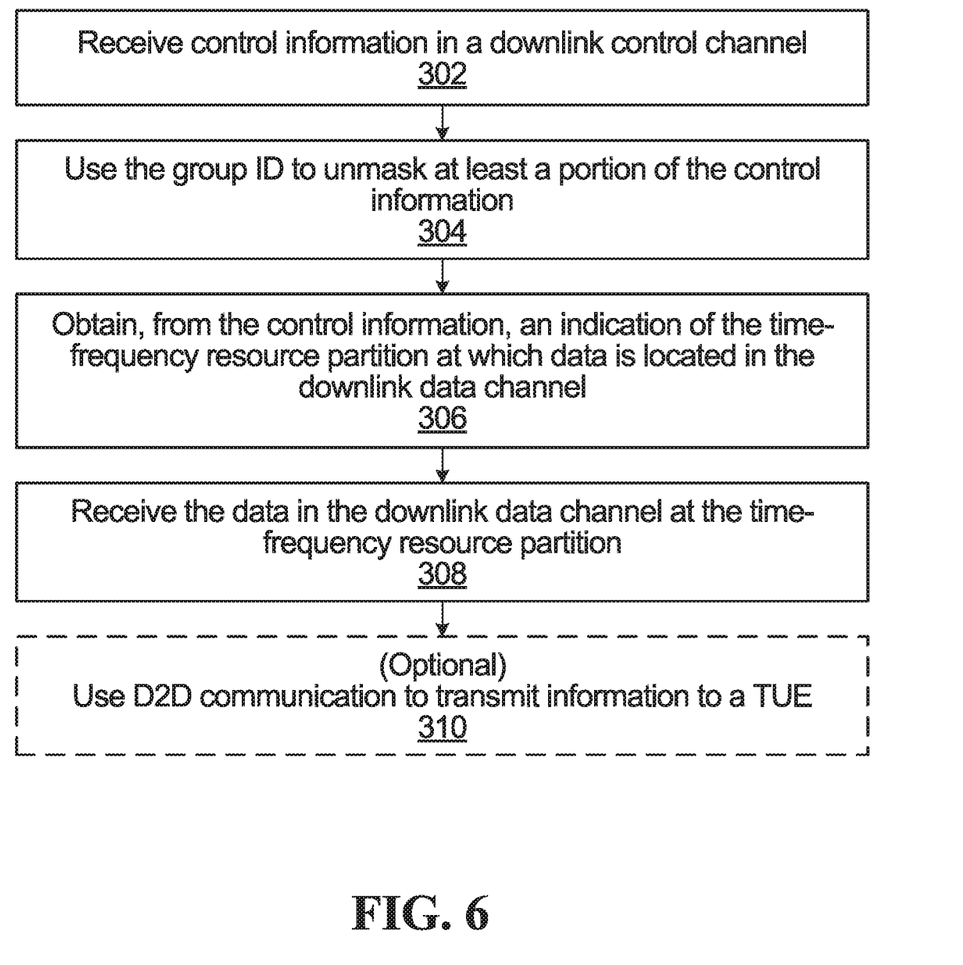
FIG. 6 is a flowchart of operations performed by a UE, according to one embodiment.

Many different examples are described above. More generally. FIG. 6 is a flowchart of operations performed by a UE, according to one embodiment.

In step 302, control information in a downlink control channel is received by the UE. The control information indicates a time-frequency resource partition at which data is located in a downlink data channel. At least a portion of the control information is masked with a group ID known to the UE and also known to at least one other UE. For example, a CRC of the control information may be masked by the group ID, e.g. using the encoder 118 by an XOR operation in the way described above in relation to FIG. 4.

In step 304, the UE uses the group ID to unmask the at least the portion of the control information. For example, the UE may unmask a masked CRC in the control information using the group ID, e.g. using the decoder 130 by an XOR operation between the masked CRC and the group ID.

In step 306, the UE obtains, from the control information, the indication of the time-frequency resource partition at which the data is located in the downlink data channel.

In step 308, the UE receives the data in the downlink data channel at the time-frequency resource partition.

If the UE is a CUE, then optionally in step 310, the UE uses D2D communication to transmit information to the TUE. If the UE is instead the TUE, then optional step 310 would instead comprise using D2D communication to receive information from another UE that also received the data using the group ID. In any case, the information may be the data, and/or a re-encoded version of the data, and/or other information obtained when decoding the data such as the actual received signal for example.

In some embodiments, the method of FIG. 6 further includes receiving a message indicating that the UE is to assist the TUE with receipt of the data. The message may be a MAC CE that is included as part of the data, as described above. Alternatively, the message may be received through RRC signaling. Alternatively, the message may be included in the control information or may be sent in a separate downlink transmission. In any case, in some embodiments the control information may include information activating and deactivating CUEs, and/or the UE may have a deactivation timer that is set or reset by the receipt of the message. In some embodiments, the message also indicates which one of a plurality of UEs is the target UE.

In some embodiments, the method of FIG. 6 may include the UE transmitting a measurement of wireless channel quality to at least one base station of the network. The measurement of wireless channel quality may be a CQI. Alternatively, the measurement of wireless channel quality may be a quality measurement of a D2D channel between UEs, e.g. the UE may transmit a channel quality measurement of a D2D channel between the UE and a TUE. The network then selects a transmission format of the downlink data based on the measurement. The transmission format may include a modulation scheme of the data and/or a coding rate of the data.

In some embodiments, downlink transmissions from the network to the UE, including downlink transmission of the data, may be performed using CoMP transmission in which a plurality of base stations communicate with the UE and the at least one other UE.

In some embodiments, the method of FIG. 6 may further include receiving the group ID from the network, e.g. via one or more base stations.

In some embodiments, the downlink data transmission received in step 308 of FIG. 6 may not be TUE specific data that originates from a TUE radio bearer. The data may instead be data meant for the UEs in a group identified by the group ID. e.g. a reference signal meant for each one of the plurality of UEs.

Figure 7:
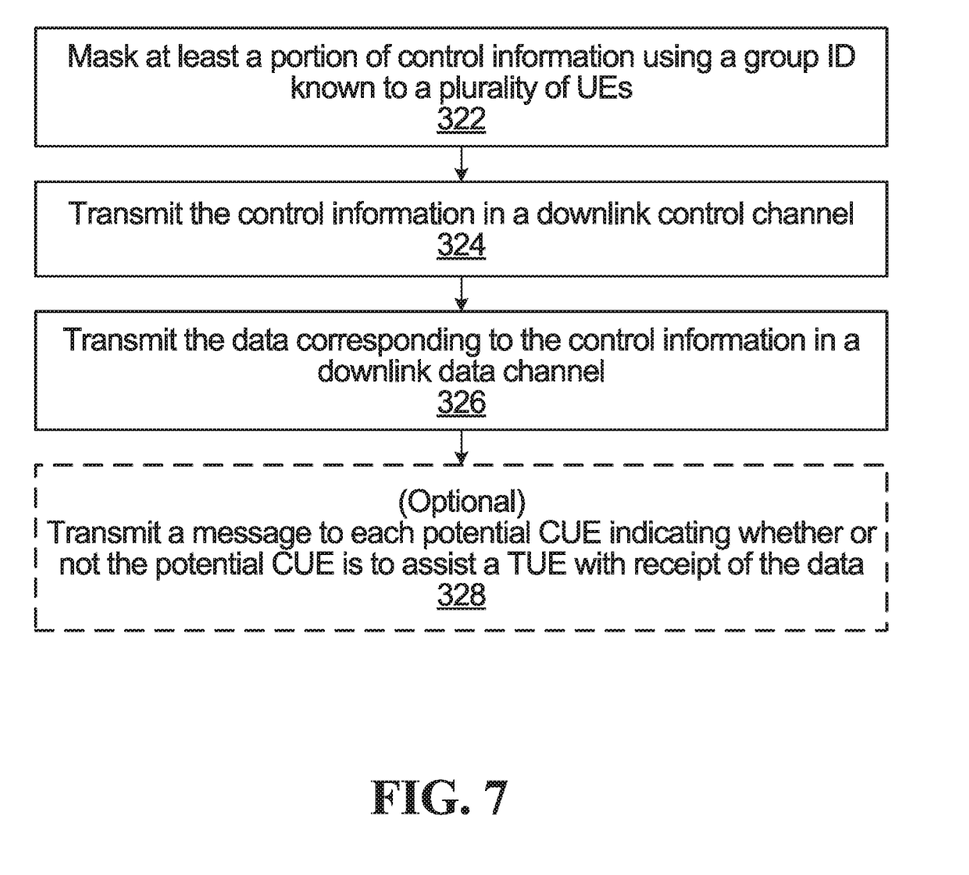
FIG. 7 is a flowchart of operations performed by the network, according to one embodiment.

FIG. 6 is from the perspective of the UE. FIG. 7 is from the perspective of the network. Specifically, FIG. 7 is a flowchart of operations performed by the network, according to one embodiment.

In step 322, at least a portion of control information is masked using a group ID known to a plurality of UEs, e.g. using encoder 118. The control information indicates a time-frequency resource partition in a downlink data channel at which downlink data is located. In some embodiments, the control information includes a CRC, and it is the CRC that is masked using the group ID. In some embodiments, the plurality of UEs includes a TUE and at least one CUE that is to use D2D communication to assist the TUE with wireless communication with the network. The data may be meant for the TUE.

In step 324, the control information is transmitted in a downlink control channel.

In step 326, the data is transmitted in the downlink data channel at the time-frequency resource partition.

In scenarios in which the data transmitted in step 326 is for a TUE of a D2D group formed by the plurality of UEs, then optionally in step 328 a message is transmitted to each potential cooperating UE. The message indicates whether or not the potential cooperating UE is to assist the TUE with receipt of the data. As above, the message may be a MAC CE that is included as part of the data, or the message may be included in the control information or may be sent in a separate downlink transmission. Also, the message may indicate the TUE that is to be assisted with receipt of the data.

In some embodiments, the method of FIG. 7 may further include receiving at least one measurement of channel quality from at least one of the plurality of UEs and determining a transmission format of the data transmitted in step 326 using the at least one measurement. For example, the at least one measurement may be a measurement of downlink channel quality (such as a CQI) from each one of the plurality of UEs. The transmission format may be determined based on the best CQI value of a CUE. The at least one measurement may also or instead include a measurement of a channel quality of a D2D channel, e.g. a measurement of the D2D channel to the TUE from each one of the plurality of UEs (or CUEs).

In some embodiments, the method of FIG. 7 may include assigning the group ID to the plurality of UEs and transmitting the group ID to the plurality of UEs.

In some embodiments, the plurality of UEs may or may not form a D2D group, and the data transmitted in step 326 data may be meant for each of the UEs. e.g. a reference signal meant for each one of the plurality of UEs.

Finally, in embodiments above, it is control information that is masked with the group ID, e.g. via scrambling using the XOR operation described earlier. However, additionally, in some embodiments, the group-assisted data may also or instead be masked with the group ID. As one example, if the group-assisted data is a reference signal, then the reference signal may be masked with the group ID. The masking may still be an XOR operation in some embodiments. In some embodiments, the whole physical downlink data channel transport block (including the CRC) may be scrambled at the bit level with a sequence that depends upon the group ID. The sequence may also depend upon other IDs, such as the cell ID or hypercell ID, for example. In some embodiments, the scrambling of the physical downlink data channel may serve a different purpose from the scrambling of the downlink control channel. For example, the scrambling of the physical downlink data channel may be more for allowing for interference randomization, i.e. there may be no blind decoding involved.

Possible Benefits Compared to MBMS and MBSFN

The embodiments described above in relation to FIGS. 4 and 5 can be considered as multicasting in that the TUE data is provided to more than one UE. However, unlike traditional multicasting, the multicasted data is meant for a particular TUE and originates from the radio bearer of the TUE. The CUEs that receive the TUE data do so for the purpose of assisting the TUE using D2D communication. This is different from traditional multicasting services, such as Multimedia Broadcast Multicast Service (MBMS).

Unlike traditional MBMS, which is optimized for multicasting multimedia in a specific area (typically multiple cells), some embodiments herein may be better suited for downlink multicast of data transmissions targeting a D2D cooperation group. Also, unlike some embodiments described herein, no user-specific adaptation of transmission parameters (e.g. MCS) can be used in traditional MBMS, i.e. no uplink feedback. In MBMS, coverage is determined by the user in worst-case condition. On the contrary, some embodiments herein above allow for UEs in the D2D group to send uplink feedback, which may be used by the processing circuitry 110 of the network 106 to determine the transmission format of the group-assisted downlink communication (e.g. the MCS) and whether a retransmission is required.

Unlike multicast-broadcast single-frequency network (MBSFN), where the same data is synchronously transmitted from multiple base stations, in some embodiments herein the network 106 can apply CoMP schemes on the network side in order optimize downlink group multicast transmission. Example CoMP schemes that may be utilized in some embodiments herein include coherent joint transmission, dynamic point transmission, and transmit diversity (e.g. non-coherent joint transmission).

In some embodiments described herein, multicast group communications can be easily frequency multiplexed with normal unicast data in any downlink subframe. For example, as shown in FIG. 4, group-assisted TUE data is at resource allocation 254 is multiplexed with UE 104b data at resource allocation 258. On the contrary, in MBSFN, once a subframe is scheduled as an MBMS subframe, the whole subframe is reserved for the MBMS multicast transmission.

MBSFN uses a multicast channel (MCH) transport channel and suffers from a lack of flexibility due to multi-cell/ multicast coordination entity (MCE) scheduling limitations and lack of an uplink feedback channel. Also, there is no MAC layer signaling of a cooperation active set in order to support UE cooperation.

Individual cells forming an MBMS service area do not need to be visible to the UEs. However, the UEs still need to be aware of which cells are transmitting in order to acquire system information. This is not the case for group-assisted downlink transmission where the transmission points can be transparent to the UEs. Also, MBSFN areas are static.

For MBSFN transmission, the same data is to be transmitted with the same transport format and the same physical resources from multiple transmit-receive-points (TRPs), typically belonging to different evolved NodeBs (eNBs). MCH transport format and resource allocation cannot be dynamically adjusted by the eNB. The transport format is determined by the MCE and signaled to the terminals as part of the information sent on the multicast control channel (MCCH).

As the MCH transmission is simultaneously targeting multiple terminals, no uplink feedback channel is available, e.g. HARQ is not applicable. No acknowledgments are supported, so radio link control (RLC) unacknowledged mode is used for both MTCH and MCCH. Also, MIMO transmission is not applicable to MCH transmission. On the contrary, embodiment disclosed herein may use the uplink feedback channel and allow for HARQ and allow for MIMO transmission.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method for receiving data by a user equipment (UE) comprising:
   receiving control information from at least one base station in a downlink control channel, the control information for a group of UEs that includes the UE, and the control information indicating at least a time-frequency resource partition in a downlink data channel at which the data from the at least one base station is located, the data being the same for all the UEs in the group of UEs, and the control information including a cyclic redundancy check (CRC) that is masked with a group identification (ID) known to the UE and at least one other UE in the group of UEs;
   using the group ID to unmask the CRC;
   obtaining an indication of at least the time-frequency resource partition from the control information;
   receiving the data from the at least one base station in the downlink data channel at the time-frequency resource partition in accordance with the indication, wherein the data comprises a medium access control (MAC) packet data unit (PDU) having both: (i) a data portion for a target UE, and (ii) a MAC control element (CE) that indicates which one or more UEs in the group of UEs are to assist the target UE with receipt of the data portion;
   determining, from the MAC CE, that the UE is to assist the target UE with receipt of the data portion;
   in response to determining that the UE is to assist the target UE with receipt of the data portion, communicating with the target UE using device-to-device (D2D) communication, wherein the communicating comprises using the D2D communication to transmit information to the target UE, wherein the information is at least one of: the data portion, a re-encoded version of the data portion, and other information obtained when decoding the data portion.

2. The method of claim 1, further comprising: transmitting a measurement of wireless channel quality to the at least one base station; and wherein a transmission format of the data is based on the measurement and at least one wireless channel quality measurement from the at least one other UE; wherein the transmission format includes at least one of: modulation scheme of the data, and coding rate of the data.

3. The method of claim 1, wherein downlink transmissions from a network to the UE, including downlink transmission of the data, are performed using coordinated multipoint transmission in which a plurality of base stations communicate with the UE and the at least one other UE.

4. A user equipment (UE) comprising:
   a receiver to receive control information from at least one base station in a downlink control channel, the control information for a group of UEs that includes the UE, and the control information indicating at least a time-frequency resource partition in a downlink data channel at which data from the at least one base station is located, the data being the same for all the UEs in the group of UEs, and the control information including a cyclic redundancy check (CRC) that is masked with a group identification (ID) known to the UE and at least one other UE in the group of UEs;
   the receiver further to receive the data from the at least one base station in the downlink data channel at the time-frequency resource partition in accordance with an indication obtained from the control information after using the group ID to unmask the CRC;
   wherein the data comprises a medium access control (MAC) packet data unit (PDU) having both: (i) a data portion for a target UE, and (ii) a MAC control element (CE) that indicates which one or more UEs in the group of UEs are to assist the target UE with receipt of the data portion;
   processing circuitry to determine, from the MAC CE, that the UE is to assist the target UE with receipt of the data portion;
   in response to determining that the UE is to assist the target UE with receipt of the data portion, the UE is to communicate with the target UE using device-to-device (D2D) communication in order to use the D2D communication to transmit information to the target UE, wherein the information is at least one of: the data portion, a re-encoded version of the data portion, and other information obtained when decoding the data portion.

* * * * *